(12) United States Patent
Neven et al.

(10) Patent No.: US 9,087,058 B2
(45) Date of Patent: Jul. 21, 2015

(54) METHOD AND APPARATUS FOR ENABLING A SEARCHABLE HISTORY OF REAL-WORLD USER EXPERIENCES

(75) Inventors: Hartmut Neven, Malibu, CA (US);
David Petrou, Brooklyn, NY (US);
Jacob Smullyan, Montclair, NJ (US);
Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/493,423

(22) Filed: Jun. 11, 2012

(65) Prior Publication Data

US 2013/0036134 A1 Feb. 7, 2013

Related U.S. Application Data

(60) Provisional application No. 61/514,788, filed on Aug. 3, 2011.

(51) Int. Cl.
*G06F 17/30* (2006.01)
*G06K 9/00* (2006.01)
*G10L 15/08* (2006.01)

(52) U.S. Cl.
CPC .... *G06F 17/30047* (2013.01); *G06F 17/30244* (2013.01); *G06F 17/30654* (2013.01); *G06F 17/30864* (2013.01); *G06K 9/00288* (2013.01); *G06K 9/00295* (2013.01); *G06K 9/00677* (2013.01); *G06F 2212/171* (2013.01); *G10L 2015/088* (2013.01)

(58) Field of Classification Search
CPC .................. G06F 17/30047; G06F 17/30026; G06F 17/30766; G06F 17/30755; G06F 17/30324; G06F 17/30241; G06F 17/30014; G06F 17/30244; G06F 17/30781; G06F 17/3074
See application file for complete search history.

(56) References Cited

U.S. PATENT DOCUMENTS

| | | | |
|---|---|---|---|
| 6,377,793 | B1 | 4/2002 | Jenkins |
| 6,480,713 | B2 | 11/2002 | Jenkins |
| 6,681,107 | B2 | 1/2004 | Jenkins et al. |
| 6,690,516 | B2 | 2/2004 | Aritake et al. |
| 7,363,024 | B2 | 4/2008 | Jenkins |
| 8,484,223 | B2 | 7/2013 | Ota |
| 8,649,776 | B2 | 2/2014 | Tofighbakhsh et al. |

(Continued)

OTHER PUBLICATIONS

Girardin et al., Uncovering the presence and movements of tourists from user-generated content, Oct. 17, 2008, pp. 1-11.*
U.S. Appl. No. 13/107,295, filed May 13, 2011, Flynn et al.
U.S. Appl. No. 13/344,299, filed Jan. 5, 2012, Anguelov et al.
Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

(Continued)

*Primary Examiner* — Leslie Wong
(74) *Attorney, Agent, or Firm* — Blakely Sokoloff Taylor & Zafman LLP

(57) ABSTRACT

A method and apparatus for enabling a searchable history of real-world user experiences is described. The method may include capturing media data by a mobile computing device. The method may also include transmitting the captured media data to a server computer system, the server computer system to perform one or more recognition processes on the captured media data and add the captured media data to a history of real-world experiences of a user of the mobile computing device when the one or more recognition processes find a match. The method may also include transmitting a query of the user to the server computer system to initiate a search of the history or real-world experiences, and receiving results relevant to the query that include data indicative of the media data in the history of real-world experiences.

22 Claims, 9 Drawing Sheets

(56) References Cited

U.S. PATENT DOCUMENTS

| | | | |
|---|---|---|---|
| 2005/0083413 A1 | 4/2005 | Reed et al. | |
| 2005/0162523 A1 | 7/2005 | Darrell et al. | |
| 2006/0264209 A1* | 11/2006 | Atkinson et al. | 455/422.1 |
| 2007/0096909 A1 | 5/2007 | Lally | |
| 2007/0250901 A1 | 10/2007 | McIntire et al. | |
| 2008/0043108 A1* | 2/2008 | Jung et al. | 348/207.1 |
| 2008/0167004 A1 | 7/2008 | Jenkins | |
| 2008/0285940 A1 | 11/2008 | Kulas | |
| 2009/0003662 A1 | 1/2009 | Joseph et al. | |
| 2009/0006937 A1 | 1/2009 | Knapp et al. | |
| 2009/0049004 A1 | 2/2009 | Nurminen et al. | |
| 2009/0089352 A1 | 4/2009 | Davis et al. | |
| 2009/0094520 A1 | 4/2009 | Kulas | |
| 2009/0100050 A1* | 4/2009 | Erol et al. | 707/5 |
| 2009/0102859 A1 | 4/2009 | Athsani et al. | |
| 2009/0165140 A1 | 6/2009 | Robinson et al. | |
| 2009/0182644 A1 | 7/2009 | Panagopulos et al. | |
| 2010/0046842 A1 | 2/2010 | Conwell | |
| 2010/0103075 A1* | 4/2010 | Kalaboukis et al. | 345/8 |
| 2010/0318507 A1 | 12/2010 | Grant et al. | |
| 2011/0025842 A1* | 2/2011 | King et al. | 348/135 |
| 2011/0069179 A1 | 3/2011 | Bathiche et al. | |
| 2011/0072015 A1 | 3/2011 | Lin et al. | |
| 2011/0135144 A1 | 6/2011 | Franklin, Jr. et al. | |
| 2011/0143811 A1* | 6/2011 | Rodriguez | 455/556.1 |
| 2011/0145214 A1 | 6/2011 | Zhang et al. | |
| 2011/0212717 A1* | 9/2011 | Rhoads et al. | 455/420 |
| 2011/0213664 A1 | 9/2011 | Osterhout et al. | |
| 2011/0255738 A1* | 10/2011 | Gao et al. | 382/103 |
| 2011/0256886 A1* | 10/2011 | Velusamy | 455/456.1 |
| 2012/0004036 A1 | 1/2012 | Hill | |
| 2012/0045093 A1* | 2/2012 | Salminen et al. | 382/103 |
| 2012/0159326 A1 | 6/2012 | Mital et al. | |
| 2012/0233000 A1* | 9/2012 | Fisher et al. | 705/14.71 |
| 2012/0320013 A1 | 12/2012 | Perez et al. | |
| 2013/0096731 A1 | 4/2013 | Tamari et al. | |
| 2013/0169626 A1* | 7/2013 | Balan et al. | 345/419 |
| 2014/0073291 A1* | 3/2014 | Hildner et al. | 455/411 |

OTHER PUBLICATIONS

Rekimoto, Jun, "Augmented Interaction: The World Through the Computer," <http://ftp.csl.sony.co.jp/person/rekimoto/navi.html>, 1995, 2 pages.

Rekimoto, Jun, "Augmented Interaction: Toward a New Human-Computer Interaction Style Based on Situation Awareness," Interactive Systems and Software II (WISS'94 Proceedings), 1994 (in Japanese), 10 pages.

Rekimoto, Jun, "The Magnifying Glass Approach to Augmented Reality Systems," International Conference on Artificial Reality and Tele-Existence 1995 / Conference on Virtual Reality Software and Technology (ICAT/VRST 1995), 10 pages.

Rekimoto, Jun, et al, "The World through the Computer: Computer Augmented Interaction with Real World Environments," User Interface Software and Technology (UIST 1995), 8 pages.

Sung, Dan, "Augmented reality in action—social networking," <http://m.pocket-lint.com/news/news.phtml/38918>, Mar. 4, 2011, 7 pages.

Screen Capture of a YouTube Video, "N'importe Comment—The Toxic Avenger Feat Orelsan," <http://www.youtube.com/watch?v=XAOwo6uuhok>, accessed May 10, 2011, 1 page.

Wikipedia, "Lifelog," <http://en.wikipedia.org/wiki/lifelog>, Last Modified Apr. 3, 2011, 3 pages.

PCT/US2012/047537; International Search Report and Written Opinion of the International Searching Authority, mailed Dec. 26, 2012, 10 pages.

PCT/US2012/047537; PCT International Preliminary Report on Patentability, mailed Feb. 13, 2014, 8 pages.

Petrou, D. et al. "Method and Apparatus for Enabling Event-Based Media Data Capture," U.S. Appl. No. 13/346,529, filed Jan. 9, 2012, whole document.

Adam H. et al. "Enabling Real-World User Experiences to Be Shared Via a Social Network," U.S. Appl. No. 13/346,564, filed Jan. 9, 2012, whole document.

* cited by examiner

US 9,087,058 B2

METHOD AND APPARATUS FOR ENABLING A SEARCHABLE HISTORY OF REAL-WORLD USER EXPERIENCES

RELATED CASES

The present application claims priority to U.S. Provisional Application Ser. No. 61/514,788, filed Aug. 3, 2011, and incorporates that application in its entirety.

TECHNICAL FIELD

Embodiments of the invention relate to the field of internet based searching, and more particularly, to enabling a searchable history of real-world user experiences.

BACKGROUND

The internet provides a vast amount of knowledge about people, places, and things. Users utilize search engines to cull through the vast array of available knowledge when they want detailed information about a particular person, place, or thing. Mobile devices may be utilized to access the internet and conduct searches from anywhere. For example, when a user is standing next to a historical landmark, he or she may search historical data for the landmark, photos relevant to the landmark, etc. A search engine returns results to the user based on the query by locating relevant content created that was found by the search engine via a web crawl. The retrieved content in the search results, however, is often generated by other users and unconnected to the user's real world experiences.

SUMMARY

A method and apparatus for enabling a searchable history of real-world user experiences is described. According to an exemplary method, media data is captured by a mobile computing device and transmitted to a server computer system. In one embodiment, the server computer system to perform one or more recognition processes on the captured media data and add the captured media data to a history of real-world experiences of a user of the mobile computing device when the one or more recognition processes find a match. In one embodiment, a query of the user is transmitted to the server computer system to initiate a search of the history or real-world experiences, and results are received that are relevant to the query that include data indicative of the media data in the history of real-world experiences.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
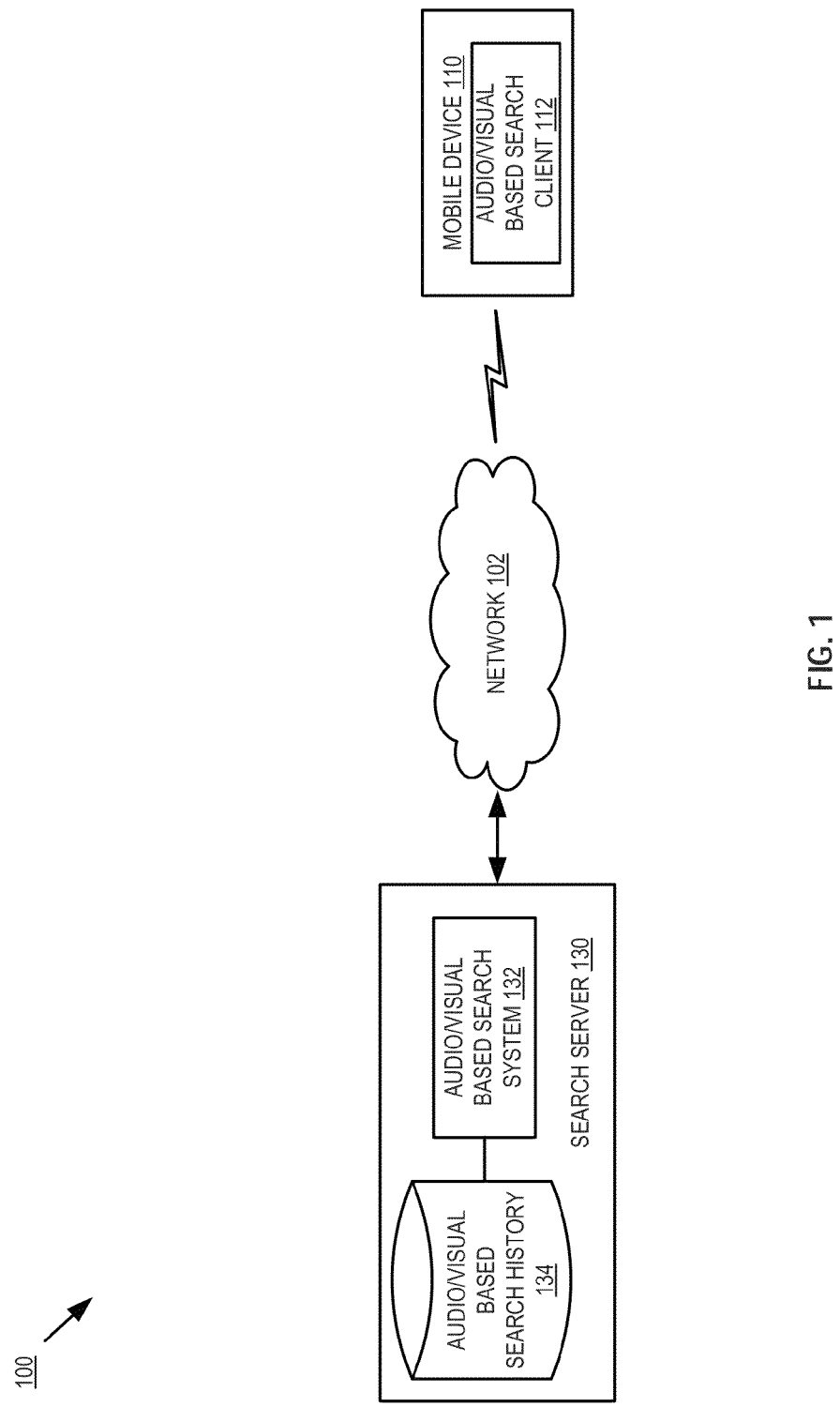
FIG. 1 is a block diagram of exemplary system architecture for enabling audio/visual based search histories.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "transmitting", "receiving", "parsing", "forming", "monitoring", "initiating", "performing", "adding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for enabling audio/visual based search histories. In one embodiment, the system 100 includes a mobile device 110 and a search server 130. In one embodiment, mobile device 110 may be a mobile computing device, such as a mobile telephone, personal digital assistant, tablet computer, wearable computing device, etc. The search server 130 may also be a computing device, such as one or more server computers, desktop computers, etc.

The mobile device 110 and search server 130 may be coupled to a network 102 that communicates any of the standard protocols for the exchange of information. In one embodiment, mobile device 110 is coupled with network 102 via a wireless connection, such as a cellular telephone connection, wireless fidelity connection, etc. The mobile device 110 and search server 130 may run on one Local Area Network (LAN) and may be incorporated into the same physical or logical system, or different physical or logical systems. Alternatively, the mobile device 110 and search server 130 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

Figure 9:
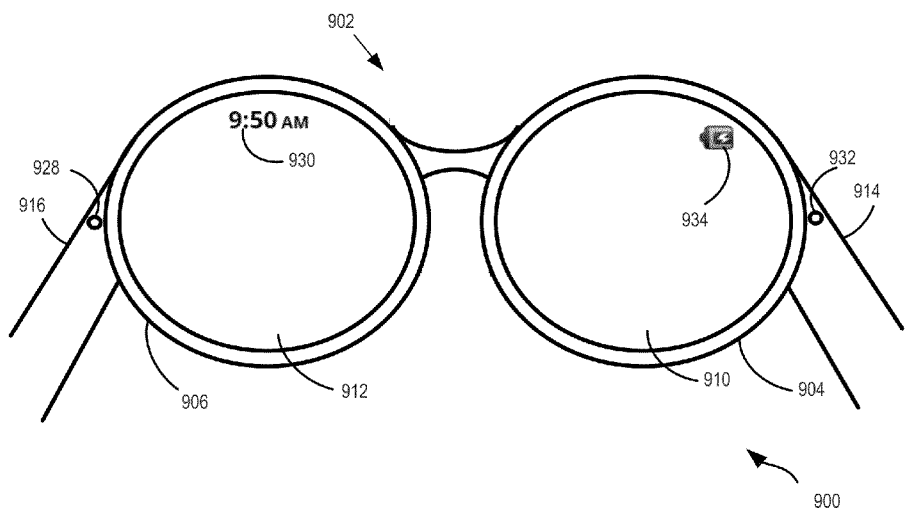
FIG. 9 illustrates an alternate view of an example system for receiving, transmitting, and displaying data.
Figure 10:
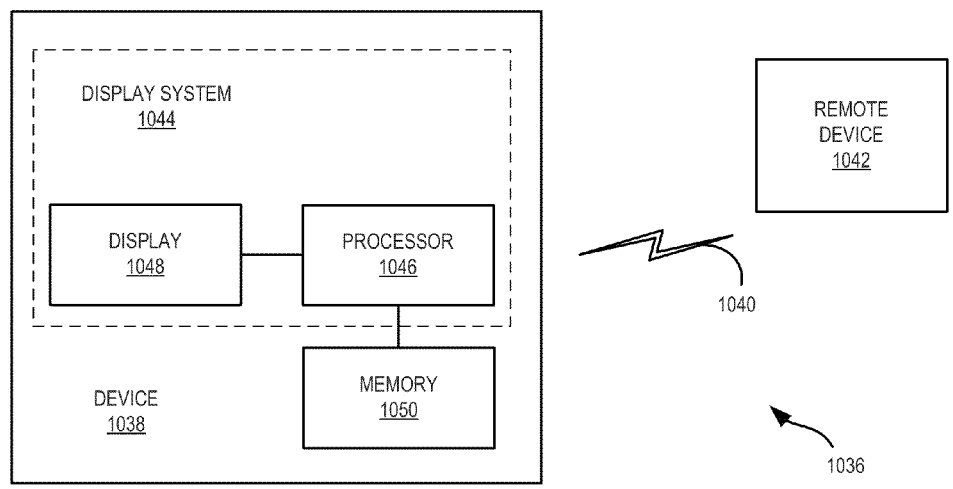
FIG. 10 illustrates an example schematic drawing of a computer network infrastructure.

The mobile device 110 is responsible for capturing digital image data with a digital camera (not shown) and capturing audio data with a microphone (not shown) of the mobile device. The captured digital image data may include still digital photographs, a series of digital photographs, recorded digital video, a live video feed, etc. The captured audio data may include audio samples, audio signatures, a live audio feed, etc. In one embodiment, mobile device 110 may be a binocular wearable computing device as illustrated in FIGS. 9 and 10, a monocular wearable computing device (i.e., a single eye head mounted display similar to those described in FIGS. 9 and 10), as well as cellular telephones, tablet computers, etc.

In one embodiment, digital image data may capture people, as well as real-world objects such as places or things, while digital audio data may capture music, conversations that convey data such as names, places, and news events, etc. In one embodiment, when mobile device 110 captures media data, such as the digital image data and/or digital audio data, audio/visual based search client 112 transmits the captured media data to search server 130. In one embodiment, audio/visual based search client 112 also transmits sensor data, such as location data and time data along with the captured media data, which corresponds to the location and time when the media data was capture. In one embodiment, an audio/visual based search system 132 of search server 130 receives the media and sensor data, and performs one or more recognition processes on the media data, as discussed below.

In one embodiment, when audio/visual based search system 132 of search server 130 receives media data from the audio/visual based search client 112, audio/visual based search system 132 performs one or more image recognition processes on digital image data and/or performs one or more audio recognition processes on the digital audio data. In one embodiment, audio/visual based search system 132 performs a face recognition process on people within the digital image data. In one embodiment, audio/visual based search system 132 also performs image matching on objects within the digital image data. Furthermore, audio/visual based search system 132 performs an audio recognition process on the audio data to determine whether a recorded or live song is playing, determine what words are being spoken, etc.

In one embodiment, when audio/visual based search system 132 identifies a specific person, a specific object (e.g., artwork, architecture, monuments, retail locations, etc.), a specific song, words indicative of location, words indicative of a person in simultaneously captured digital image, etc., audio/visual based search system 132 stores data indicative of the match in the audio/visual based search history 134. The stored match is a record of a user experience in the real world. In one embodiment, audio/visual based search system 132 further stores the sensor data along with the match, as well as data indicative of a user of the mobile device. For example, when a person is matched within digital image data, audio/visual based search system 132 may store the person's identity, the location where the digital image was captured, and the time the digital image was captured in a database record or searchable index within audio/visual based search history 134. Furthermore, the entry in the audio/visual based search history 134 is stored along with the user identification data, such as user account, a unique ID, etc.

In one embodiment, mobile device 110 continues to capture media data and transmit the captured media data to search server 130. The recognition processes are performed on the additional media data, and matches are stored in the audio/visual based search history 134. Since the audio and/or video data matches are stored in association with data identifying a user of mobile device 110, a history of user experiences in the real world captured by mobile device 110 is stored at the audio/visual based search history 134. In one embodiment, the history of real-world user experiences is searchable, as discussed below.

In one embodiment, mobile device 110 is also responsible for receiving user queries to search audio/visual based search history 134. In one embodiment, other computing devices, such as a personal computer, laptop, tablet computer, smartphone, etc., may receive and transmit queries against a history of user experiences, as discussed below. In one embodiment, the query may be a text based query entered into a user interface of audio/visual based search client 112, and transmitted by mobile device 110 to search server 130. In one embodiment, the query may also be a spoken or audio query received by audio/visual based search client 112 via a microphone (not shown) of mobile device 110, and transmitted to search server 130. When the query is a spoken or audio query, audio/visual based search client 112 may either transmit the audio to search server 130, or mobile device 110 may parse the query to locate keywords which are then transmitted as a text-based query to search server 130.

In one embodiment, audio/visual based search system 132 receives the user query from audio/visual based search client 112. As discussed above, when a query is a spoken or audio query that has not been parsed (i.e., the query is audio data), audio/visual based search system 132 parses the query to locate keywords, as discussed above. Audio/visual based search system 132 performs the search against the audio/visual based search history 134 for items relevant to the query and which are related to the user identification data associated with a user of mobile device 110. Audio/visual based search system 132 transmits results of the search to mobile device for audio/visual based search client 112 to display to a user.

In one embodiment, the history of user experiences stored at audio/visual based search history 134 enable queries to be executed on a user's history of real-world experiences, such as "What was the playlist of songs at the party last night?", "What were the paintings I saw when I was on vacation in Paris?", "Who were the people at the business lunch this afternoon?", "How many books did I read in May?", etc. The queries enable a user to search and locate the people, places, and things that he or she has experienced.

In one embodiment, queries may be issued for histories across multiple users. For example, friends on a social networking website may specify that their user experience histories on audio/visual based search history 134 are available for searches by friends, the public, members of user groups, etc. Thus, a user might be able to enter queries such as "Where were my friends last night?", "What did John see on vacation?", etc.

In yet another embodiment, queries may be issued for histories that have been generated by multiple users. A group of users may be generating histories for a common purpose. For example, a group of security guards, airport screeners, etc. may generate histories while they are working. Then at a later point in time, a query such as "Show me the faces of all people that were seen between 1 P.M. and 3 P.M." may be entered by any member of the group, a supervisor in charge of the group, etc.

Figure 2:
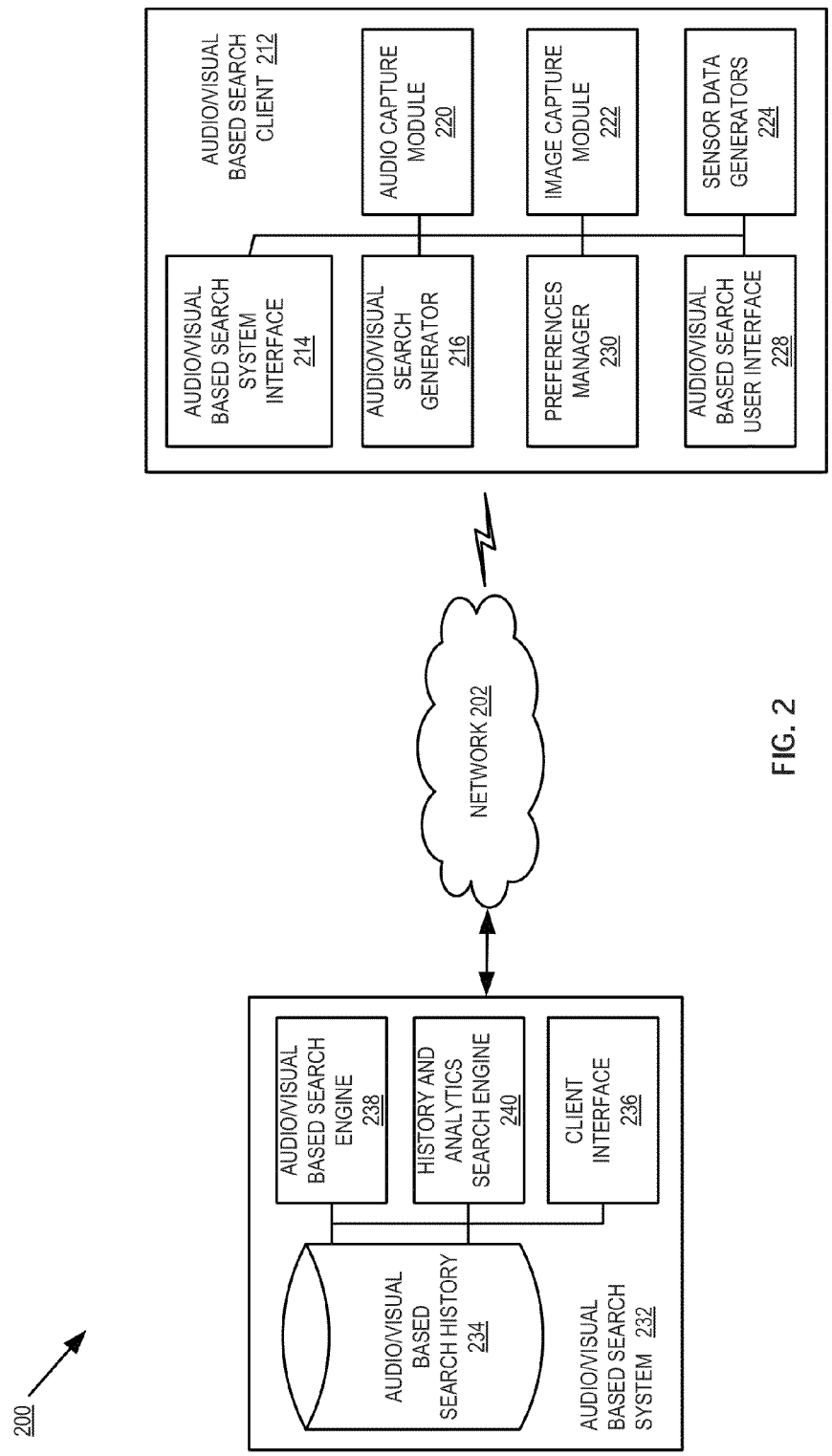
FIG. 2 is a block diagram of one embodiment of an audio/visual based search system and an audio/visual based search client.

FIG. 2 is a block diagram of one embodiment 200 of an audio/visual based search system and a audio/visual based search client. Audio/visual based search client 212 and audio/visual based search system 232 provide additional details for the audio/visual based search client 112 and audio/visual based search system 132 discussed above in FIG. 1.

In one embodiment, audio/visual based search client 212 may include an audio capture module 220, an image capture module 222, sensor data generators 224, an audio/visual search generator 216, audio/visual based search system interface 214, a preferences manager 230, and an audio visual based search user interface 228. In one embodiment, audio/visual based search system 232 may include client interface 236, history and analytics search engine 240, audio/visual based search engine 238, and audio/visual based search history 234. In one embodiment, the audio/visual based search client 212 and audio/visual based search system 232 communicate with each other over various networks 202 and network configurations as discussed above in FIG. 1.

In the audio/visual based search client 212, preference manager 230 enables a user to specify when media data is captured by audio capture module 220 and image capture module 220 for generating a history of user experiences, as discussed herein. In one embodiment, preference manager 230 enables a user to specify that image data and/or audio data are transferred to audio/visual based search system 232 when captured by a user initiated event, such as a user taking a picture, speaking into a microphone, pressing a button on audio/visual based search user interface 228 indicating that user wishes to add media data to audio/visual based search history 234, etc. In another embodiment, preference manager 230 enables a user to set location based preferences where audio/visual based search client 212 is to capture media data.

For example, when a mobile device is in Mountain View, Calif., audio/visual based search client 212 may be set to continuously, or at regular periodic intervals, capture media data without a user initiating the media capture. As another example, preferences manager 230 may monitor a user's current location to determine if they are in a popular location (e.g., one in which a certain number of other users have captured media data for experience histories). When the user is determined to be within a popular location, preference manager may automatically turn on media capture without intervention of a user. In another embodiment, preferences manager 230 may be set to continuously or periodically capture media data for a specific interval of time. For example, media may be continuously captured for two hours after a specific event (e.g., after arriving at a specific location, in response to a user command, etc.). In yet another embodiment, preference manager 230 enables a user to set media capture to always on, so that audio capture module 220 and image capture module 222 are continuously capturing media data without a user initiating the media capture. In one embodiment, preferences manager 230 may change the settings for media data capture between the modes discussed above based on current conditions of a battery of a mobile device. In one embodiment, preferences setting may be received, changed, updated, etc. via a user interface provided by audio/visual based search user interface 228.

In one embodiment, in response to the capture of media and based on the preferences set within preferences manager 230, audio/visual search generator 216 prepares the captured media data for transmission to audio/visual based search system 232. In one embodiment, audio/visual search generator 216 generates digital signatures for objects within image data captured by image capture module 222, selects audio samples or generates digital signatures from audio data captured by audio capture module 220, and obtains data from sensor data generators 224, such as location data, time data, acceleration data, etc. In another embodiment, audio/visual search generator 216 does not generate image signatures or locate audio samples. Audio/visual search generator 216 combines the media data with the sensor data, which are then transmitted by audio/visual based search system interface to the client interface 236 of audio/visual based search system 232.

In one embodiment, client interface 236 forwards the media data to audio/visual based search engine 238. In one embodiment, when audio/visual based search engine 238 receives digital image data and/or audio data, audio/visual based search engine 238 generates digital signatures for objects within the received image data and selects audio samples from the received audio data. However, as discussed above, audio/visual based search engine 238 may also receive image signatures and audio samples, and thus does not need to generate the signatures and samples. In one embodiment, audio/visual based search engine 238 utilizes the digital image signatures and/or audio samples to perform one or more recognition processes on the media data to attempt to determine specific objects, people, things, etc. within digital image data, or determine words, a song title, people's names, etc., within audio data. In one embodiment, audio/visual based search engine 238 utilizes the image signatures and/or audio samples to search visual and audio search servers, databases, indexes, etc. (not shown). When audio/visual based search engine 238 finds a match, indicating that an object within image data or a sound within audio data has been recognized, audio/visual based search engine 238 stores the results in audio/visual based search history 234. In one embodiment, audio/visual based search engine 238 also stores user identification data and received sensor data, such as location, time, etc., along with the match results. As discussed above, as more matches are found for media data captured by a user, a history of user experiences is created by audio/visual based search system 232.

In one embodiment, a user is enabled to search an associated history of user experiences by generating search queries. In one embodiment, audio/visual based search user interface 228 is responsible for receiving user search queries. In one embodiment, audio/visual based search user interface 228 receives queries in the form of text inputted into a user interface of audio/visual based search user interface 228. In another embodiment, audio/visual based search user interface 228 receives queries in the form of audio input received by audio capture module. In this embodiment, voice command based searching is received by audio/visual based search user interface 228 in the form of spoken word. In one embodiment, audio/visual based search user interface 228 parses the voice command based search to locate keywords. Based on the keywords, audio/visual based search user interface 228 generates a keyword based search query. Regardless of the way a query is generated, audio/visual based search system interface 214 transmits the query to client interface 236.

In one embodiment, history and analytics search engine 240 receives the search query from client interface 236. History and analytics search engine 240 then perform the search on the audio/visual bases search history 234 associated with the user who generated the search. Because the audio/visual based search history stores a history of user experiences, history and analytics search engine 240 executes searches such as "How many books did I read last month?", "Who was at the club this weekend?", "What buildings did I see in Sydney, Australia?", etc. History and analytics search engine 240 receives results of the search, and client interface 236 transmits the results to audio/visual based search client 212, which are displayed to a user via audio/visual based search user interface 228.

Figure 3:
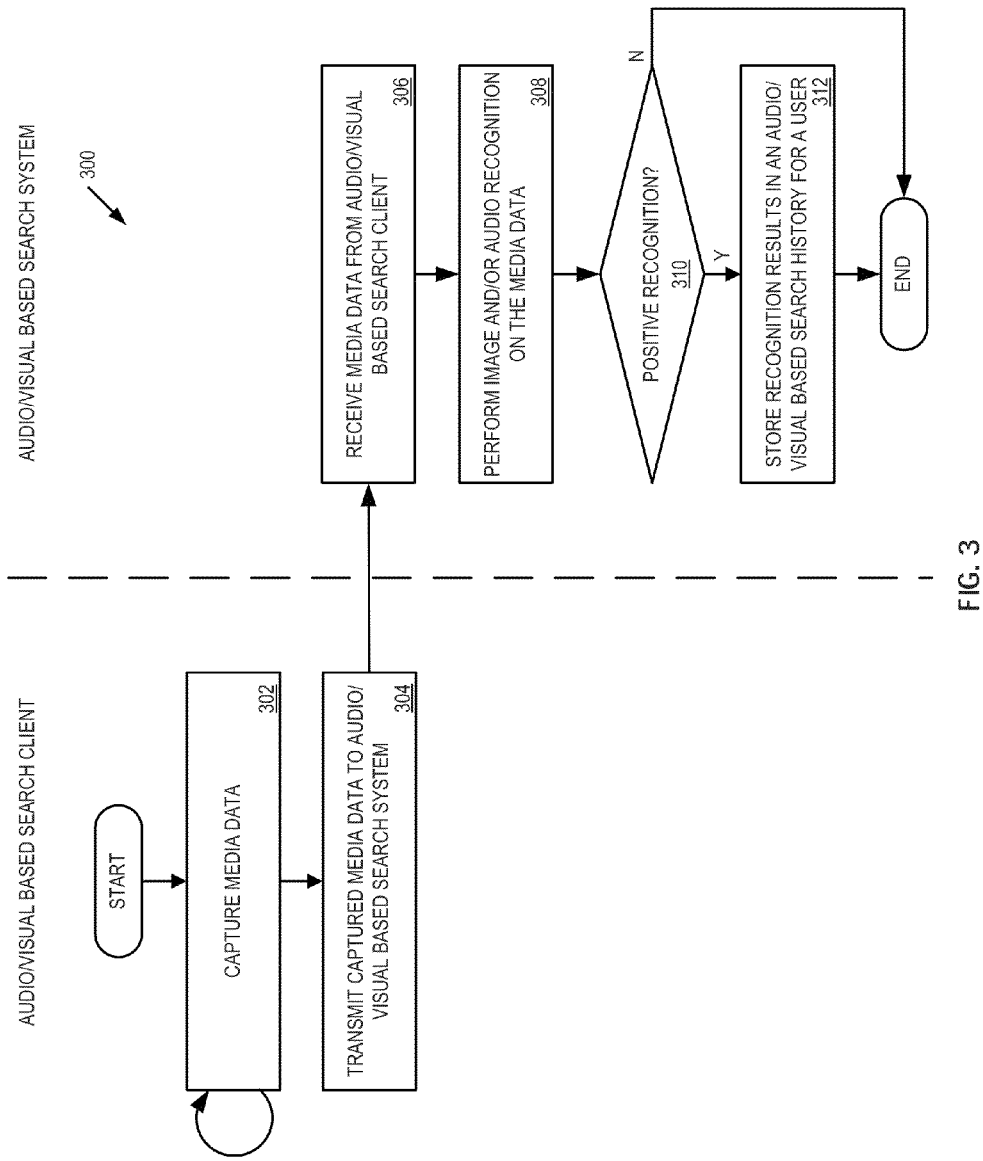
FIG. 3 is a flow diagram of one embodiment of a method for generating a searchable history of user experiences.

FIG. 3 is a flow diagram of one embodiment of a method 300 for generating a searchable history of user experiences. The method 300 is performed by processing logic that may comprise hardware (circuitry, dedicated logic, etc.), software (such as is run on a general purpose computer system or a dedicated machine), firmware, or a combination. In one embodiment, the method 300 is performed by an audio/visual based search client and a audio/visual based search system (e.g., audio/visual based search client 112 or 212, and audio/visual based search system 132 or 232).

Referring to FIG. 3, processing logic begins by capturing media data (processing block 302). In one embodiment, a mobile device, such as a cellular telephone, tablet computer, monocular wearable processing system, binocular wearable processing system, etc., captures the media data with a camera and/or microphone of the mobile device. As discussed herein, media data includes digital image data and/or digital audio data. Furthermore, the data may include streaming media data, pictures, audio samples, etc. In one embodiment, the media data captures real-world events associated with a user of the mobile device. Processing logic transmits the captured media data to the audio/visual based search system (processing block 304). In one embodiment, the media data, or samples of the media data, may be transferred to the audio/visual based search system. In another embodiment, processing logic generates digital signatures of objects within digital image data, and selects audio samples from digital audio data, which are transmitted to audio visual based search system.

Processing logic receives the captured media data from the audio/video visual based search client (processing block 306). In one embodiment, where processing logic receives media data and not image signatures and/or audio samples, processing logic generates the digital signatures for the objects within the received digital image data, and selects audio samples from received digital audio data. Processing logic performs image and/or audio recognition on the media data (processing block 308). In one embodiment, processing logic utilizes the digital image signatures to search for real world objects, people, or other objects with matching image signatures. Furthermore, processing logic utilizes samples of audio to search for audio, such as songs, voice, etc., that match the audio samples.

Processing logic then determines whether a person, object, or sound has been recognized (processing block 310). When there is no match within the media data for faces, objects, or audio, the process ends. However, when a match is found, and thus a person, object, or sound within the media data has been identified, processing logic stores the results in an audio/visual based search history for a user (processing block 312).

In one embodiment, each transfer of media data, digital signatures, or audio samples from the audio/visual based search client is accompanied by user identification data, such as a user name and password, unique identification data associated with the user, etc. In one embodiment, each matched result is therefore associated with a specific user. As additional media data is matched and associated with a user, a history of a user's real-world experiences is created. That is, a record of what a user has seen and heard is created to enable the searching of the user's history.

In one embodiment, a group of users may be associated with the same history. For example, a group of security guards, airport screeners, family members, corporate employees, etc. may be associated with a history of user experiences. Then each of the experiences of the individual members in the group is added to the single history in order to provide a more thorough history over a period of time from several vantage points. Furthermore, when the history is searched, as discussed below, the multiple inputs to the search history ensure a more thorough coverage of real-world events that are relevant to the group.

Figure 4:
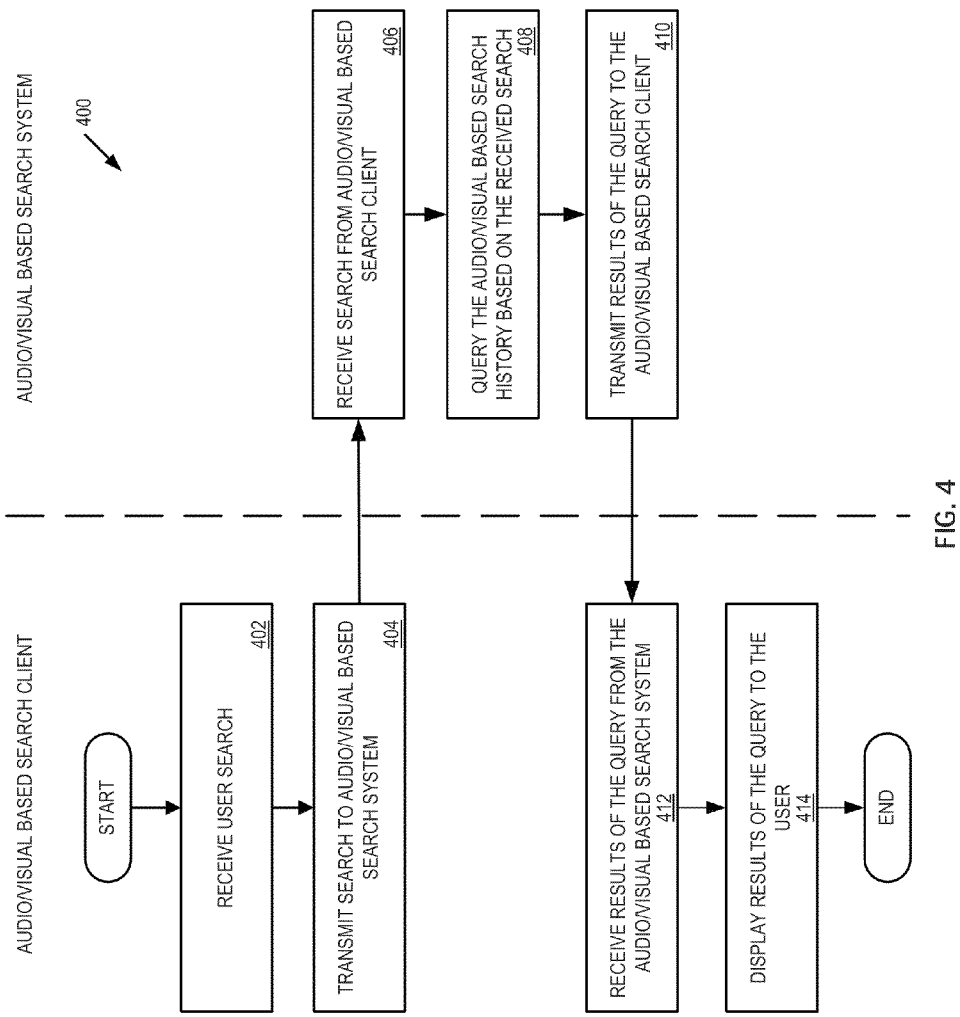
FIG. 4 is a flow diagram of one embodiment of a method for searching a history of user experiences.

FIG. 4 is a flow diagram of one embodiment of a method 400 for searching a history of user experiences. The method 400 is performed by processing logic that may comprise hardware (circuitry, dedicated logic, etc.), software (such as is run on a general purpose computer system or a dedicated machine), firmware, or a combination. In one embodiment, the method 400 is performed by an audio/visual based search client and a audio/visual based search system (e.g., audio/visual based search client 112 or 212, and audio/visual based search system 132 or 232).

Referring to FIG. 4, processing logic begins by receiving a user search (processing block 402). In one embodiment, the search is a search to be executed on a history of the user's real-world experiences, which have been captured and recorded in an audio/visual based search history. For example, the search may include searches such as "Show me people that were at the party last night?", "What songs were playing at the club last weekend?", "Show me all artwork I saw in Vienna?", etc.

In one embodiment, the search may be a text-based search entered into a user interface of a mobile device. In one embodiment, the search may be a voice activated search received by a microphone of the mobile device. When the search is a voice activated search, in one embodiment, processing logic parses the audio data for the voice activated search to locate keywords. Based on the located keywords processing logic is able to generate a text-based keyword search. In one embodiment, the keywords may include time and location restrictions for a history of real-world experiences. Processing logic then transmits the search to an audio/visual based search system (processing block 404).

The search is received from the audio visual based search system (processing block 406) and processing logic queries an audio/visual based search history based on the received search (processing block 408). For example, a search might request "Show me all artwork I saw in Vienna?" Processing logic would query the audio/visual based search history for image matches within a user's history for artwork that includes location metadata indicative of the artwork's location in Vienna, Austria. As another example, a search might request "What was the playlist at the club last night?" Processing logic would query the audio/visual based search history for audio matches that include song titles over a period of time on the specified date. Processing logic transmits results of the query to the audio/visual based search client (processing block 410).

Processing logic receives the results of the query from the audio/visual based search system (processing block 412) and displays the results of the query to the user (processing block 414). In one embodiment, the results of the query display data indicative of the media data in the user history of real world experiences. For example, query results that include digital images may include the display of thumbnail images indicative of the media data in the history of user experiences. As another example, query results that include audio data may include the display of album artwork that corresponds to matched songs in the history of user experiences. In one embodiment, processing logic displays the results in a graphical user interface to a user. For example, the results display may be displayed on a map indicating the locations where matches relevant to the query have occurred, along a timeline illustrating the relationship between when matches relevant to the query have occurred, displayed in a slider that enables a user to browse a plurality of different matches relevant to the query, etc.

Figure 5:
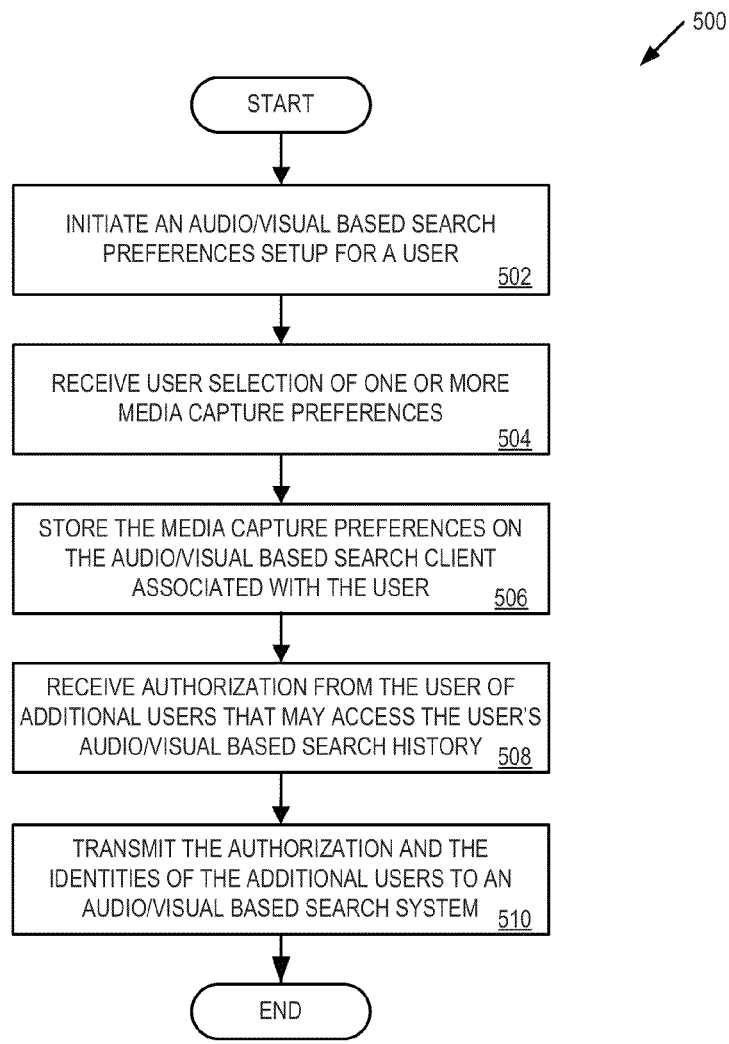
FIG. 5 is a flow diagram of one embodiment of a method for setting preferences for the creation of a searchable history of user experiences.

FIG. 5 is a flow diagram of one embodiment of a method 500 for setting preferences for the creation of a searchable history of user experiences. The method 500 is performed by processing logic that may comprise hardware (circuitry, dedicated logic, etc.), software (such as is run on a general purpose computer system or a dedicated machine), firmware, or a combination. In one embodiment, the method 500 is performed by an audio/visual based search client (e.g., audio/visual based search client 112 or 212).

Referring to FIG. 5, processing logic begins by initiating an audio/visual based search preferences setup for a user (processing block 502). In one embodiment, different search preferences have an impact on battery consumption by a mobile device that is executing processing logic. For example, the continuous capture of a video stream and audio stream would more quickly drain a battery of the mobile device, then the periodic capture of similar image and audio data. Thus, in one embodiment, processing logic enables the selection of different media data capture options to provide a spectrum of power consumption options to a user.

Processing logic receives user selection of one or more media capture preferences (processing block 504). There are several preference variations for when and how often media data is captured by a mobile device. In embodiments, some of the variations are automatic and transparent to a user, such as the continuous capture of one or both of digital video data and digital audio data, the periodic capture of media data at preset intervals, the capture of media data based on proximity to a specific location, and the capture of media data based on a proximity to a popular location. In one embodiment, the capture of media data may also be based on a user initiated event, such as the user taking a picture, recording a message, etc. Processing logic stores the media capture preferences on the audio/visual based search client associated with a user (processing block 506).

Processing logic receives authorization from the user for additional users that may access the user's audio/visual based search history (processing block 508). In one embodiment, a history of a user's real world experiences may be shared, and thus made searchable, with other users. In one embodiment, a user may share their history of experiences with friends on a social networking system, other members of an organization, other employees of a company, etc.

Processing logic transmits the authorization and the identities of the additional users to an audio/visual based search system (processing block 510). In one embodiment, processing logic transmits the authorization so that an audio/visual based search system 232 permits the authorized user to search histories that are not the authorized user's.

Figure 6:
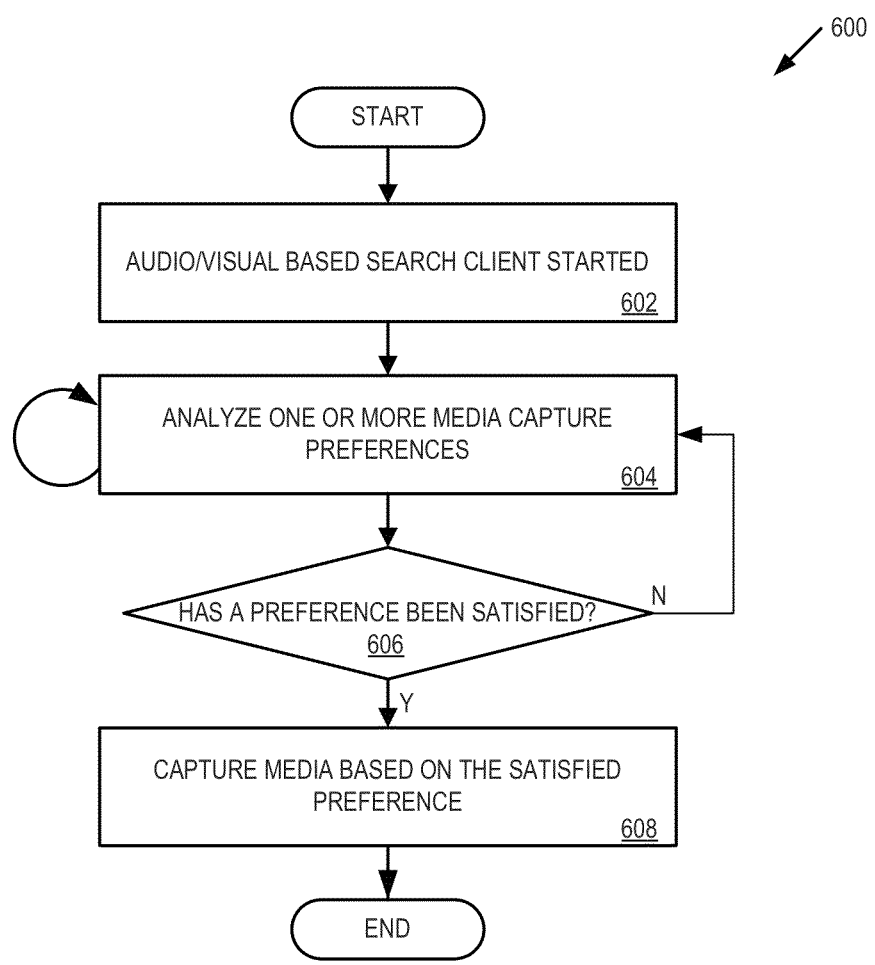
FIG. 6 is a flow diagram of one embodiment of a method for capturing media data for the creation of a history of user experiences based on user preferences.

FIG. 6 is a flow diagram of one embodiment of a method 600 for capturing media data for the creation of a history of user experiences based on user preferences. The method 600 is performed by processing logic that may comprise hardware (circuitry, dedicated logic, etc.), software (such as is run on a general purpose computer system or a dedicated machine), firmware, or a combination. In one embodiment, the method 600 is performed by an audio/visual based search client (e.g., audio/visual based search client 112 or 212).

Referring to FIG. 6, processing logic begins by starting an audio/visual based search client (processing block 602). Processing logic analyzes one or more media capture preferences (processing block 604). As discussed herein, the preferences may indicate to processing logic that media data capture should be initiated when a mobile device is proximate to a specific location, within specified time interval, etc. When processing logic determines that a preference has been satisfied (processing block 606), processing logic captures media data based on the satisfied preference (processing block 608). In one embodiment, the preference specify whether digital image data, digital audio data, or both are to be captured, whether continuous media data is to be capture or whether media data is to be captured at periodic intervals, how long the media data is to be captured etc.

However, when processing logic determines that one or more preferences have not been satisfied (processing block 606), processing logic returns to processing block 604 to continue to analyze media capture preferences (processing block 604). In one embodiment, processing logic may determine that the condition(s) relevant to the capture of media data, which were previously satisfied, are no longer satisfied. In this case, processing logic would cease the capture of media data based on that preference.

Figure 7:
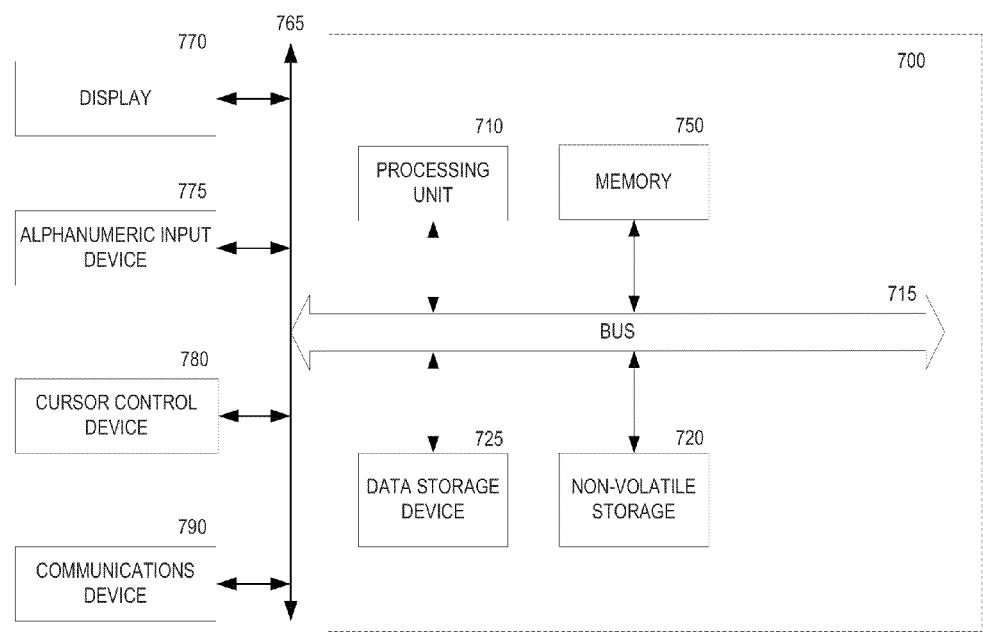
FIG. 7 is one embodiment of a computer system that may be used with the present invention.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

Figure 8:
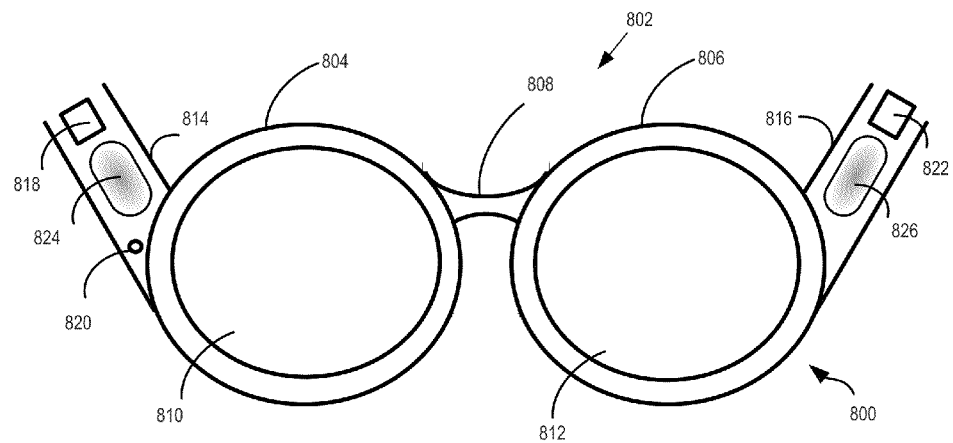
FIG. 8 illustrates an example system for receiving, transmitting, and displaying data.

FIG. 8 illustrates an example system 800 for receiving, transmitting, and displaying data. The system 800 is shown in the form of a wearable computing device. While FIG. 8 illustrates eyeglasses 802 as an example of a wearable computing device, other types of wearable computing devices could additionally or alternatively be used, such as a monocular wearable computing device with a single eye head mounted display. As illustrated in FIG. 8, the eyeglasses 802 comprise frame elements including lens-frames 804 and 806 and a center frame support 808, lens elements 810 and 812, and extending side-arms 814 and 816. The center frame support 808 and the extending side-arms 814 and 816 are configured to secure the eyeglasses 802 to a user's face via a user's nose and ears, respectively. Each of the frame elements 804, 806, and 808 and the extending side-arms 814 and 816 may be formed of a solid structure of plastic or metal, or may be formed of a hollow structure of similar material so as to allow wiring and component interconnects to be internally routed through the eyeglasses 802. Each of the lens elements 810 and 812 may be formed of any material that can suitably display a projected image or graphic. Each of the lens elements 810 and 812 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 814 and 816 are each projections that extend away from the frame elements 804 and 806, respectively, and are positioned behind a user's ears to secure the eyeglasses 802 to the user. The extending side-arms 814 and 816 may further secure the eyeglasses 802 to the user by extending around a rear portion of the user's head. Additionally or alternatively, for example, the system 800 may connect to or be affixed within a head-mounted helmet structure. Other possibilities exist as well.

The system 800 may also include an on-board computing system 818, a video camera 820, a sensor 822, and finger-operable touch pads 824, 826. The on-board computing system 818 is shown to be positioned on the extending side-arm 814 of the eyeglasses 802; however, the on-board computing system 818 may be provided on other parts of the eyeglasses 802. The on-board computing system 818 may include a processor and memory, for example. The on-board computing system 818 may be configured to receive and analyze data from the video camera 820 and the finger-operable touch pads 824, 826 (and possibly from other sensory devices, user interfaces, or both) and generate images for output from the lens elements 810 and 812.

The video camera 820 is shown to be positioned on the extending side-arm 814 of the eyeglasses 802; however, the video camera 820 may be provided on other parts of the eyeglasses 802. The video camera 820 may be configured to capture images at various resolutions or at different frame rates. Many video cameras with a small form-factor, such as those used in cell phones or webcams, for example, may be incorporated into an example of the system 800. Although FIG. 8 illustrates one video camera 820, more video cameras may be used, and each may be configured to capture the same view, or to capture different views. For example, the video camera 820 may be forward facing to capture at least a portion of the real-world view perceived by the user. This forward facing image captured by the video camera 820 may then be used to generate an augmented reality where computer generated images appear to interact with the real-world view perceived by the user.

The sensor 822 is shown mounted on the extending side-arm 816 of the eyeglasses 802; however, the sensor 822 may be provided on other parts of the eyeglasses 802. The sensor 822 may include one or more of a gyroscope or an accelerometer, for example. Other sensing devices may be included within the sensor 822 or other sensing functions may be performed by the sensor 822.

The finger-operable touch pads 824, 826 are shown mounted on the extending side-arms 814, 816 of the eyeglasses 802. Each of finger-operable touch pads 824, 826 may be used by a user to input commands. The finger-operable touch pads 824, 826 may sense at least one of a position and a movement of a finger via capacitive sensing, resistance sensing, or a surface acoustic wave process, among other possibilities. The finger-operable touch pads 824, 826 may be capable of sensing finger movement in a direction parallel or planar to the pad surface, in a direction normal to the pad surface, or both, and may also be capable of sensing a level of pressure applied. The finger-operable touch pads 824, 826 may be formed of one or more translucent or transparent insulating layers and one or more translucent or transparent conducting layers. Edges of the finger-operable touch pads 824, 826 may be formed to have a raised, indented, or roughened surface, so as to provide tactile feedback to a user when the user's finger reaches the edge of the finger-operable touch pads 824, 826. Each of the finger-operable touch pads 824, 826 may be operated independently, and may provide a different function.

FIG. 9 illustrates an alternate view 900 of the system 800 of FIG. 8. As shown in FIG. 9, the lens elements 910 and 912 may act as display elements. The eyeglasses 902 may include a first projector 928 coupled to an inside surface of the extending side-arm 916 and configured to project a display 930 onto an inside surface of the lens element 912. Additionally or alternatively, a second projector 932 may be coupled to an inside surface of the extending side-arm 914 and configured to project a display 934 onto an inside surface of the lens element 910.

The lens elements 910 and 912 may act as a combiner in a light projection system and may include a coating that reflects the light projected onto them from the projectors 928 and 932. In some embodiments, a special coating may not be used (e.g., when the projectors 928 and 932 are scanning laser devices).

In alternative embodiments, other types of display elements may also be used. For example, the lens elements 910, 912 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 904 and 906 for driving such a matrix display. Alternatively or additionally, a laser or LED source and scanning system could be used to draw a raster display directly onto the retina of one or more of the user's eyes. Other possibilities exist as well.

FIG. 10 illustrates an example schematic drawing of a computer network infrastructure. In one system 1036, a device 1038 communicates using a communication link 1040 (e.g., a wired or wireless connection) to a remote device 1042. The device 1038 may be any type of device that can receive data and display information corresponding to or associated with the data. For example, the device 1038 may be a heads-up display system, such as the eyeglasses 802 and 902 described with reference to FIGS. 8 and 9.

Thus, the device 1038 may include a display system 1044 comprising a processor 1046 and a display 1048. The display 1048 may be, for example, an optical see-through display, an optical see-around display, or a video see-through display. The processor 1046 may receive data from the remote device 1042, and configure the data for display on the display 1048. The processor 1046 may be any type of processor, such as a micro-processor or a digital signal processor, for example.

The device 1038 may further include on-board data storage, such as memory 1050 coupled to the processor 1046. The memory 1050 may store software that can be accessed and executed by the processor 1046, for example.

The remote device 1042 may be any type of computing device or transmitter including a laptop computer, a mobile telephone, etc., that is configured to transmit data to the device 1038. The remote device 1042 and the device 1038 may contain hardware to enable the communication link 1040, such as processors, transmitters, receivers, antennas, etc.

In FIG. 10, the communication link 1040 is illustrated as a wireless connection; however, wired connections may also be used. For example, the communication link 1040 may be a wired link via a serial bus such as a universal serial bus or a parallel bus. A wired connection may be a proprietary connection as well. The communication link 1040 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 142 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method comprising:
   receiving one or more settings of a mobile computing device that indicate when media data is to be captured by the mobile computing device;
   initiating capture of media data by the mobile computing device based on the one or more settings and one or more real-world conditions associated with the mobile computing device;
   transmitting the captured media data to a server computer system, the server computer system to perform one or more recognition processes on the captured media data and add the captured media data to a history of real-world experiences of a user of the mobile computing device when the one or more recognition processes find a match;
transmitting a query of the user to the server computer system to initiate a search of the history of real-world experiences; and
receiving results relevant to the query that include data indicative of the captured media data in the history of real-world experiences,
wherein the one or more settings comprise initiation of media data capture by the mobile computing device when a current location of the mobile computing device is proximate to a popular location, wherein the location is a popular location when a number of other users that have captured media data at the location exceeds a threshold.

2. The computer-implemented method of claim 1, wherein the mobile computing device is a user wearable computing device with a head mounted display.

3. The computer-implemented method of claim 1, wherein the query is a voice activated query received via a microphone of the mobile computing device.

4. The computer-implemented method of claim 3, further comprising:
parsing audio data for the voice activated query to locate one or more keywords in the audio data; and
forming a text based keyword query for transmission to the server computer system.

5. The computer-implemented method of claim 1, wherein the one or more settings comprise initiation of media data capture by the mobile computing device when the mobile computing device is proximate to a specific location.

6. The computer-implemented method of claim 1, wherein the one or more settings comprise how frequently the media data is to be captured.

7. The computer-implemented method of claim 1, wherein the media data comprises one or more of digital image data and digital audio data.

8. A non-transitory computer readable storage medium including instructions that, when executed by a processor, cause the processor to perform a method comprising:
receiving one or more settings of a mobile computing device that indicate when media data is to be captured by the mobile computing device;
initiating capture of media data by the mobile computing device based on the one or more settings and one or more real-world conditions associated with the mobile computing device;
transmitting the captured media data to a server computer system, the server computer system to perform one or more recognition processes on the captured media data and add the captured media data to a history of real-world experiences of a user of the mobile computing device when the one or more recognition processes find a match;
transmitting a query of the user to the server computer system to initiate a search of the history of real-world experiences; and
receiving results relevant to the query that include data indicative of the captured media data in the history of real-world experiences,
wherein the one or more settings comprise initiation of media data capture by the mobile computing device when a current location of the mobile computing device is proximate to a popular location, wherein the location is a popular location when a number of other users that have captured media data at the location exceeds a threshold.

9. The non-transitory computer readable storage medium of claim 8, wherein the mobile computing device is a user wearable computing device with a head mounted display.

10. The non-transitory computer readable storage medium of claim 8, wherein the query is a voice activated query received via a microphone of the mobile computing device.

11. The non-transitory computer readable storage medium of claim 10, further comprising:
parsing audio data for the voice activated query to locate one or more keywords in the audio data; and
forming a text based keyword query for transmission to the server computer system.

12. The non-transitory computer readable storage medium of claim 8, wherein the one or more settings comprise initiation of media data capture by the mobile computing device when the mobile computing device is proximate to a specific location.

13. The non-transitory computer readable storage medium of claim 8, wherein the one or more settings comprise how frequently the media data is to be captured.

14. The non-transitory computer readable storage medium of claim 8, wherein the media data comprises one or more of digital image data and digital audio data.

15. A mobile computing device comprising:
a memory; and
a processor coupled with the memory to
receive one or more settings of a mobile computing device that indicate when media data is to be captured by the mobile computing device,
initiate capture of media data based on the one or more settings and one or more real-world conditions associated with the mobile computing device,
transmit the captured media data to a server computer system, the server computer system to perform one or more recognition processes on the captured media data and add the captured media data to a history of real-world experiences of a user of the mobile computing device when the one or more recognition processes find a match,
transmit a query of the user to the server computer system to initiate a search of the history of real-world experiences, and
receive results relevant to the query that include data indicative of the captured media data in the history of real-world experiences,
wherein the one or more settings comprise initiation of media data capture by the mobile computing device when a current location of the mobile computing device is proximate to a popular location, wherein the location is a popular location when a number of other users that have captured media data at the location exceeds a threshold.

16. The system of claim 15, wherein the mobile computing device is a user wearable computing device with a head mounted display.

17. The system of claim 15, wherein the query is a voice activated query received via a microphone of the mobile computing device, and wherein the processor is to parse audio data for the voice activated query to locate one or more keywords in the audio data, and form a text based keyword query for transmission to the server computer system.

18. The system of claim 15, wherein the one or more settings comprise initiation of media data capture by the mobile computing device when the mobile computing device is proximate to a specific location.

19. The system of claim 15, wherein the one or more settings comprise how frequently the media data is to be captured.

20. The system of claim 15, wherein the media data comprises one or more of digital image data and digital audio data.

21. A computer-implemented method comprising:
 receiving media data, at a server computer system, captured by a mobile computing device, the media data captured based on one or more setting received by the mobile device indicative of when media data is to be captured and based on one or more real-world conditions associated with the mobile computing device, wherein the one or more settings comprise initiation of media data capture by the mobile computing device when a current location of the mobile computing device is proximate to a popular location, wherein the location is a popular location when a number of other users that have captured media data at the location exceeds a threshold;
 performing one or more recognition processes on the captured media data;
 adding the captured media data to a history of real-world experiences of a user of the mobile computing device when the one or more recognition processes find a match;
 receiving a query from the mobile computing device to initiate a search of the history of real-world experiences; and
 transmitting results relevant to the query that include data indicative of the captured media data in the history of real-world experiences.

22. A non-transitory computer readable storage medium including instructions that, when executed by a processor, cause the processor to perform a method comprising:
 receiving media data, at a server computer system, captured by a mobile computing device, the media data captured based on one or more setting received by the mobile device indicative of when media data is to be captured and based on one or more real-world conditions associated with the mobile computing device, wherein the one or more settings comprise initiation of media data capture by the mobile computing device when a current location of the mobile computing device is proximate to a popular location, wherein the location is a popular location when a number of other users that have captured media data at the location exceeds a threshold;
 performing one or more recognition processes on the captured media data;
 adding the captured media data to a history of real-world experiences of a user of the mobile computing device when the one or more recognition processes find a match;
 receiving a query from the mobile computing device to initiate a search of the history of real-world experiences; and
 transmitting results relevant to the query that include data indicative of the captured media data in the history of real-world experiences.

* * * * *